No. 768,647. PATENTED AUG. 30, 1904.
E. H. BAARE.
MACHINE FOR BRANDING CROWN CORKS.
APPLICATION FILED OCT. 16, 1903.
NO MODEL. 7 SHEETS—SHEET 1.

Fig. 1

WITNESSES:

INVENTOR:
Edwin H. Baare
BY
Hugh K. Wagner
His Attorney.

No. 768,647. PATENTED AUG. 30, 1904.
E. H. BAARE.
MACHINE FOR BRANDING CROWN CORKS.
APPLICATION FILED OCT. 16, 1903.
NO MODEL. 7 SHEETS—SHEET 2.

Fig. 2

WITNESSES:

INVENTOR:
Edwin H. Baare,
BY Hugh K. Wagner
His ATTORNEY.

No. 768,647. PATENTED AUG. 30, 1904.
E. H. BAARE.
MACHINE FOR BRANDING CROWN CORKS.
APPLICATION FILED OCT. 16, 1903.
NO MODEL. 7 SHEETS—SHEET 4.

WITNESSES:
Cor Maupt
Gladys Walton

INVENTOR:
Edwin H. Baare,
BY Hugh K. Wagner
His ATTORNEY.

No. 768,647. PATENTED AUG. 30, 1904.
E. H. BAARE.
MACHINE FOR BRANDING CROWN CORKS.
APPLICATION FILED OCT. 16, 1903.
NO MODEL. 7 SHEETS—SHEET 5.

WITNESSES:

INVENTOR:
Edwin H. Baare,
BY Hugh N. Wagner
His ATTORNEY.

No. 768,647. PATENTED AUG. 30, 1904.
E. H. BAARE.
MACHINE FOR BRANDING CROWN CORKS.
APPLICATION FILED OCT. 16, 1903.
NO MODEL. 7 SHEETS—SHEET 7.

No. 768,647. Patented August 30, 1904.

UNITED STATES PATENT OFFICE.

EDWIN H. BAARE, OF ST. LOUIS, MISSOURI, ASSIGNOR TO ARTHUR E. POSS, OF ST. LOUIS, MISSOURI.

MACHINE FOR BRANDING CROWN-CORKS.

SPECIFICATION forming part of Letters Patent No. 768,647, dated August 30, 1904.

Application filed October 16, 1903. Serial No. 177,232. (No model.)

*To all whom it may concern:*

Be it known that I, EDWIN H. BAARE, a citizen of the United States, residing in the city of St. Louis and State of Missouri, have invented certain new and useful Improvements in Machines for Branding Crown-Corks, of which the following is a specification.

This invention is of a machine especially designed, arranged, and constructed for the purpose of branding crown-corks.

Machines for branding the old style elongated cylindrical corks in order to show the date of bottling are in use; but heretofore crown-corks have not been branded because of the lack of suitable machinery for that purpose.

In the drawings, in which like numbers of reference denote like parts wherever they occur.

Figure 2:
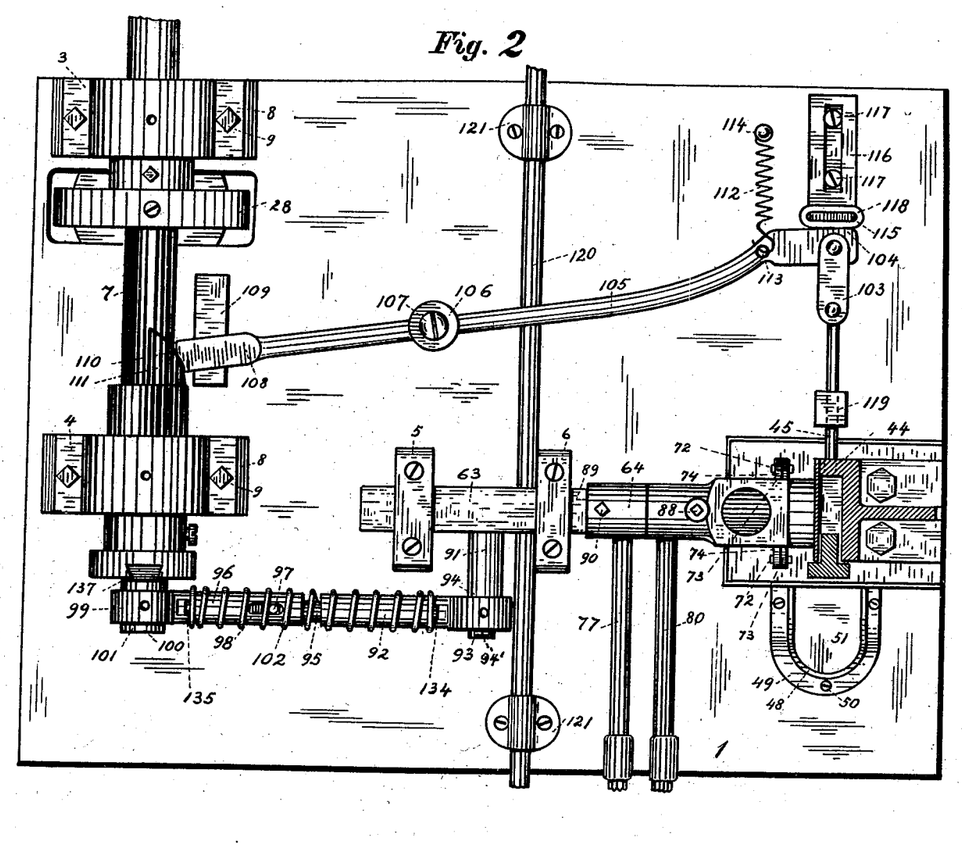
Fig. 2 is a top plan view of the parts of my machine resting on the table thereof, with the cork-chute partially shown in section.
Figures 5, 6, 7, 8, 12, 13, 14:
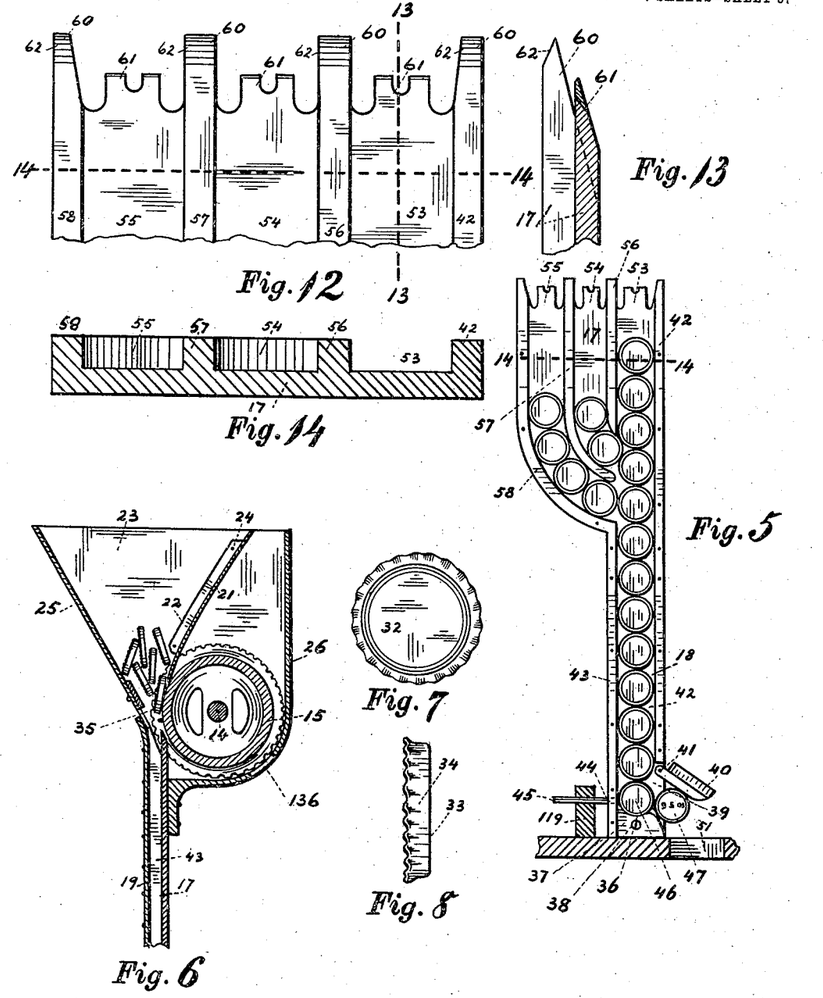
Fig. 5 is a front view of the cork-chute with the front plate or wall removed.
Fig. 6 is an interior view of the hopper, showing the corrugated roller, the feed-plate, &c.
Figs. 7 and 8 are respectively bottom and side views of the article to be branded—namely, a crown-cork.
Fig. 12 is a front elevation of the extreme upper portion of the plate forming the back of the cork-chute, showing teeth that receive and the teeth that separate the corks for transmission down the several divisions of the chute.
Fig. 13 is a cross-sectional view on the line 13 13, Fig. 12.
Fig. 14 is a sectional view of the rear plate of the cork-chute, taken on the line 14 14, Figs. 5 and 12, with the corks removed.
Figure 15:
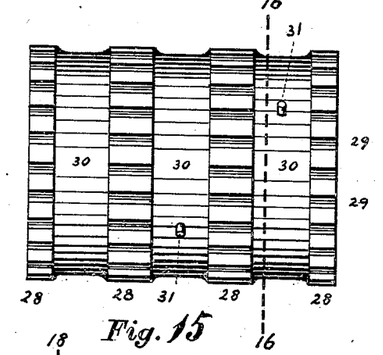
Fig. 15 is a detail view of the corrugated roller located in the hopper.
Figure 16:
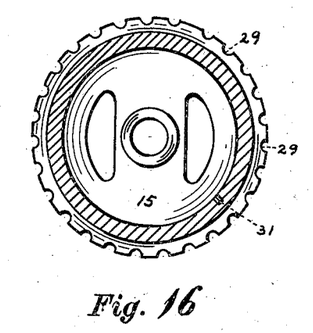
Fig. 16 is a sectional view of the same on the line 16 16, Fig. 15.
Figures 18, 19:
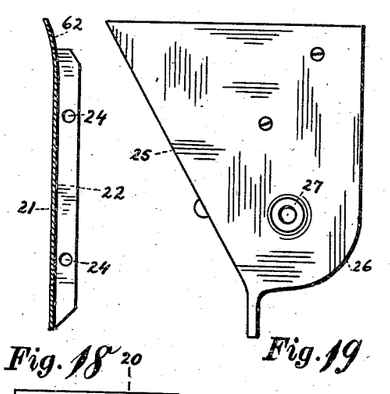
Fig. 18 is a cross-sectional view of the same on the line 18 18, Fig. 17.
Fig. 19 is an exterior detail view of the hopper.
Figure 20:
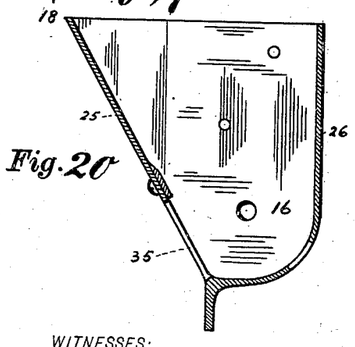
Fig. 20 is a sectional view of the hopper on the line 20 20, Fig. 21.
Figure 21:
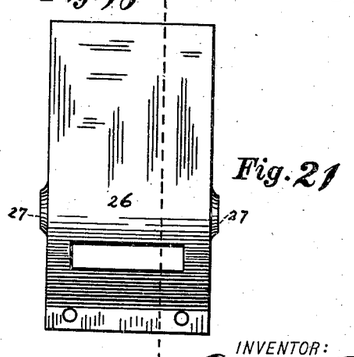
Fig. 21 is a rear elevation of the hopper.
Figures 22, 23:
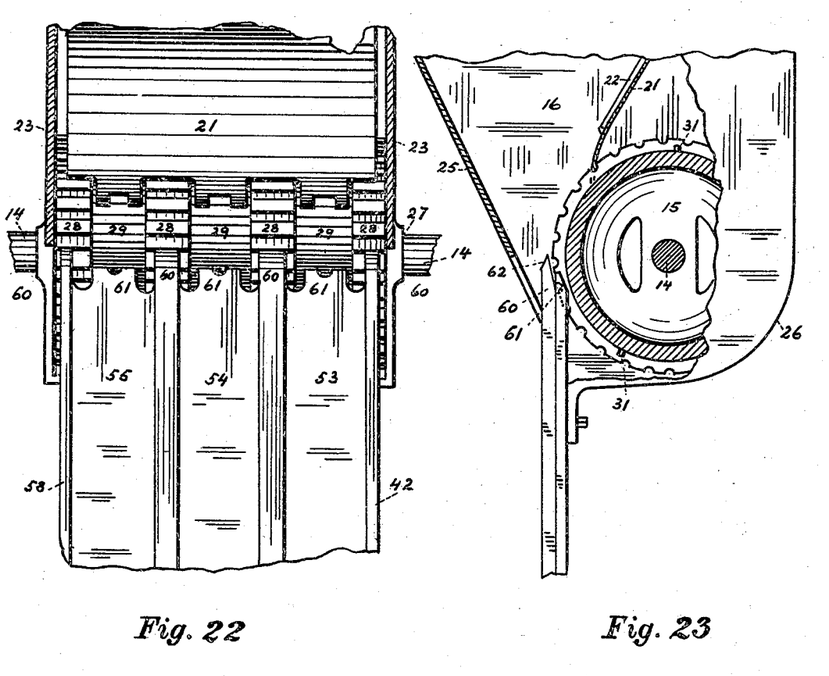
Fig. 22 is a detail in front elevation of the feed-plate, the roller in the hopper, and the back of the top portion of the cork-chute.
Fig. 23 shows a detail of said parts, partly in section and partly in side elevation.

1 is a table or frame supported by a plurality of legs 2 and having the standards 3, 4, 5, and 6 projecting thereabove. The standards or pillow-blocks 3 and 4 support the shaft 7, and the caps 8 are secured to said pillow-blocks by the set-screws 9. The shaft 7 has mounted upon it the small grooved wheel 10 and the similar large wheel 11, power to actuate the entire mechanism being received on wheel 11 from belt 12 and communicated, by means of wheel 10 and belt 13, to the shaft 14, on which the corrugated roller 15 in the hopper 16 is mounted, said hopper being supported above the table 1 by a vertical post or plate 17, which is grooved at 18 in its forward face to form, in conjunction with the removable plate 19, which forms a facing or front covering for said groove 18, a chute from the hopper 16, by which means, as will be hereinafter described more in detail, the crown-corks to be branded are presented in continuous succession at the base of the groove 18 opposite the branding-iron 20. The hopper 16 is approximately of the form indicated in Figs. 6, 19, and 20, having within it a feeding-plate 21, formed with a flange 22, by means of which same is attached to the inside of the walls 23 of the hopper 16 by the screws or rivets 24, said feed-plate 21 being so arranged within the hopper with relation to the forward wall 25 of the hopper, which is inclined in an oblique direction, as to form a space substantially V-shaped in vertical section, into which the crown-corks to be branded are fed, it being unnecessary to exercise the slightest care or discrimination in the manner of feeding said crown-corks, as the arrangement of the opening from the hopper and the revolution of the corrugated roller 15 rectify the position of each and every one of the crown-corks after they have passed into the said V-shaped space in the hopper or hopper proper before same passes downwardly into the cork-chute. In the space between the feed-plate 21 and the rear wall 26 of the hopper is located the shaft 14, journaled at 27 in the side walls 23 of the hopper. Mounted upon said shaft or formed integral therewith is the roller 15, having the circumferential grooved or corrugated ribs 28, the grooves 29, forming the corrugations therein, running in a direction substantially longitudinal with said roller. The channels 30 between said ribs 28 are each provided with the pin 31, the uses of which will now be explained. The arrangement of the hopper, as hereinbefore described, is with the object of causing all the crown-corks to drop down the cork-chute with the inside or cork side facing to the front of the machine in order that when they reach their lowest limit in the groove 18 the cork disk 32 may face the branding-iron 20 instead of the tin back 33, the cork disk being held within the metal flange 34. When the crown-corks are thrown into the V-shaped portion of the hopper, as shown in Fig. 6, they are turned in both directions, part of them facing to the front and part to the rear. The roller 15 being rotated, the corrugations of the ribs 28 on said roller agitate the corks that touch the same and in this way tend to rectify their position, casting them off from the roller again and again as often as they try to pass through the opening 35 into the cork-chute. This operation of the corrugations on the roller 15 necessarily throws some of the crown-corks into the channels 30, circumferentially formed in said roller, and if and when a crown-cork falls into such channel in the wrong position the pin 31 in the particular channel in which said cork happens to be when the roller revolves into proper position strikes the inside of the upper portion of the flange 34 of the crown-cork, which makes it turn a somersault and faces it to the front, with the result that it feeds with the cork disk 32 thereof in position to receive the impact of the branding-iron 20. When said crown-cork has reached its lowest position at the foot of the groove 18, forming the end of the cork-chute, said crown-cork in said lowest position rests in the hollow or groove 36 in the shoe 37, which is attached, by means of the screw 38, to the post or plate 17 in such a position as to touch the table 1. Immediately above and partially opposite said shoe 37 is the opening 39, normally closed by the weighted trap-door 40, which is pivoted at 41 to the web 42 of the post or plate 17, the groove 18 being formed between said web and the web 43 on the opposite side of said plate. The shoe 38 is formed with a beveled or curved surface toward said opening 39 in order that the branded crown-corks may escape therefrom more easily. Through the web 43 and opposite said opening 39 is another opening, 44, (shown in dotted lines in Figs. 2 and 5,) through which the plunger-pin 45 reciprocates to push out each successive crown-cork immediately after it has been branded while resting in the position of the cork numbered 46 in Fig. 5, the cork numbered 47 being in said figure illustrated as just having been dislodged from the position occupied by cork 46 by the impact of the plunger-pin 45, which pressed said cork 47 against the weighted trap-door 40, causing it to rise and leave the opening 39 free for the exit of the cork 47, the weight of the trap-door 40 tending immediately to close same after the exit of each successive branded crown-cork, said branded crown-corks being caught by the hood 48 immediately upon their exit from the opening 39, said hood 48 being provided with the flange 49, by means of which and the screws 50 it is attached to the table 1, and said hood 48 surrounding an opening 51 in the table 1, through which the corks successively drop into a receptacle placed underneath said table. The manner of imparting motion to the plunger-pin 45 will be hereinafter more particularly described.

Figures 3, 9:
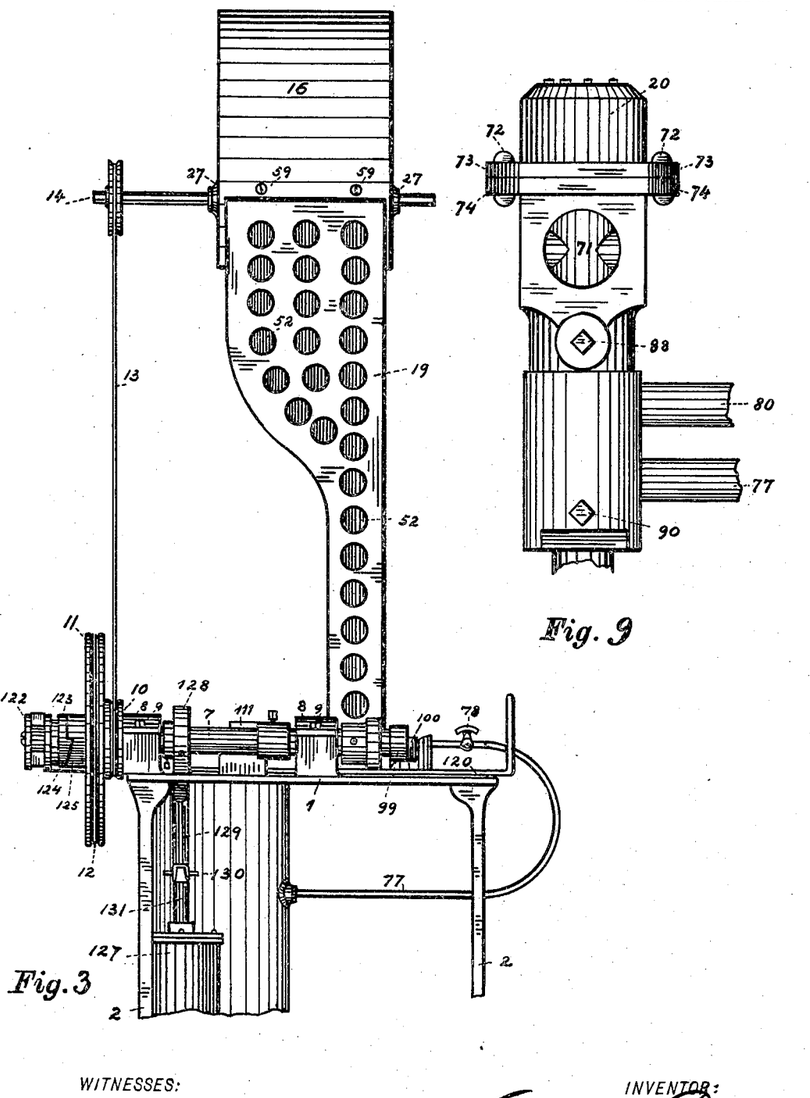
Fig. 3 is a front elevation of the extreme upper portion of the machine, showing same in its relation to the table and attached parts, being on a reduced scale as compared with Figs. 1 and 2.
Fig. 9 is a top plan view of the branding-iron and connected parts.
Figures 4, 10, 11:
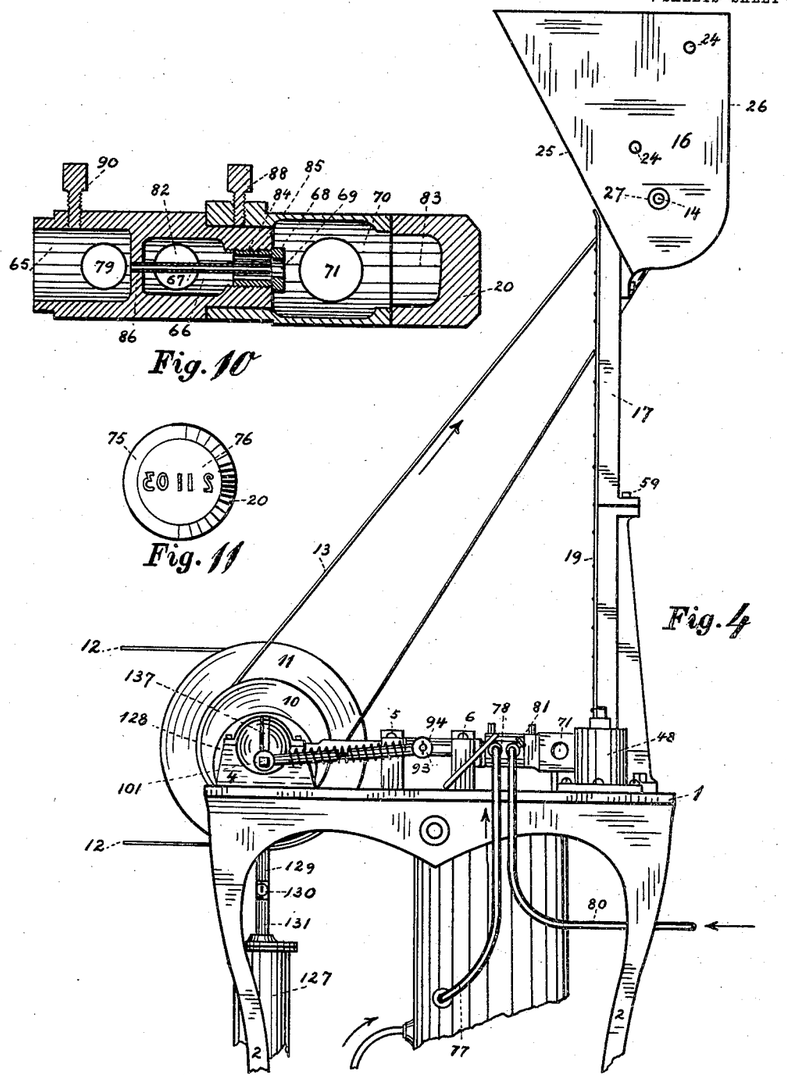
Fig. 4 is a side elevation analogous to Fig. 3.
Fig. 10 is a horizontal longitudinal sectional view of the same.
Fig. 11 is an end view of the branding-iron.
Figure 17:
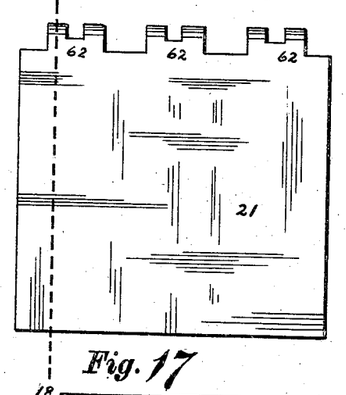
Fig. 17 is a detail view of the feeding-plate in the hopper.

The cork-chute in its lower portion consists of the single groove 18, formed between the webs 42 and 43 of the plate 17, same being covered or faced in order to retain the corks by the plate 19, which has a plurality of openings 52 therein. At the upper portion said plate 17 is formed with a plurality of passages or grooves 53, 54, 55, &c., the web 42 being continued upward and forming the wall of one of said passages 53, there being formed on the other side of the passage 53 a relatively short web 56, between which and the partly-straight and partly-curved web 57 lies the groove or passage 54, and the groove or passage 55 being formed between said web 57 and the outside curved web 58. This arrangement produces the result indicated in Fig. 5, where the crown-corks to be branded are shown in the several grooves or passages of the cork-chute, the main line of corks going down the groove 18, but an auxiliary supply being ready at hand in the passages 54 and 55 to fill in any interstices or intermissions in the supply of crown-corks in groove 18. The plate 19 is enlarged in its upper portion, as plainly depicted in Fig. 3, in order to cover all of the passages 53, 54, 55, &c., and is attached to the plate or post 17 by the screws 59. The upper portion of the post or plate 17 is formed in the peculiar shape shown in Fig. 12, with long teeth 60, which are opposite the corrugated ribs 28 of the roller 15. The shorter bifurcated teeth 61 are opposite the channels 30 of the roller 15 and are also opposite the teeth 62, somewhat similarly shaped, formed upon the feed-plate 21, the teeth 62 fitting down approximately close to the roller 15 within the channels 30. The teeth 60 stand somewhat forward of the teeth 61, and the latter are relatively closer to the roller 15, as clearly illustrated in Fig. 13. Both sets of teeth 60 and 61 are also beveled at 62 on their forward surfaces, thus bringing them to a point. The feed-plate 21 is shown upside down in Figs. 17 and 18.

The arrangement of the several parts just described effects the regular, even, successive, and satisfactory delivery of a line of crown-corks from the hopper to the point opposite the branding-iron, as hereinbefore described.

I shall now proceed to describe the branding-iron and the operation thereof.

The standards 5 and 6 are slotted or otherwise arranged for the reciprocation in connection therewith or therethrough of the plunger 63, bearing the cylinder 64, containing the air-chamber 65, gas-chamber 66, a tube 67, which communicates with both said gas-chamber and said air-chamber, the burner-head 68, having an opening 69 therethrough, and the combustion-box 70, having the openings 71 in its two side walls and top and a solid bottom wall and having affixed to its outer end, by means of the bolts 72, passing through the plate 73 and received into the lugs 74, the branding-iron 20, having the beveled portion 75, leading down to the embossed plate or portion 76. Air is admitted into the chamber 65 through the tube 77, the admission being controlled by the cock 78, said tube being provided with a screw-threaded end (not shown) coöperating with screw-threads (not shown) in the opening 79. Gas is admitted into the chamber 66 through the pipe 80, which is controlled by the cock 81, being attached by screw-threading in the opening 82 in the same manner as tube 77. Air under pressure having been admitted into chamber 65, it passes through the small opening in the slender tube 67 until it reaches a point adjacent to the opening 69 in the burner 68. Gas under pressure having been similarly admitted into chamber 66, the air and the gas mix at a point immediately adjacent to the opening 69, from which the flame issues and fills the combustion-box 70 and cavity 83 in the branding-iron, maintaining in this manner when lighted a steady and reliable heat in the branding-iron 20. The burner-head 68 is screw-threaded at 84 and coöperates with similar screw-threads 85 on the inside of the reduced portion of the cylinder 64.

The cylinder 64 has an interior wall or diaphragm 86, which separates the chambers 65 and 66, and the combustion-box 70, which terminates in the cylindrical portion 87, is removable from the end of said cylinder 64, being ordinarily held in place thereon by the set-screw 88. The cylinder 64 is in like manner removable from the reduced portion 89 of the plunger 63, on which it is normally held by the set-screw 90. Thus the branding-iron 20 may be removed from the combustion-box, as it is merely attached thereto by the bolts 72. The combustion-box, with its connected cylindrical portion 87, may be removed from the cylinder 64 by unscrewing the set-screw 88, and the cylinder 64 may be released from the reduced solid portion 89 of the plunger 63 by loosening the set-screw 90. As the plunger 63, cylinder 64, box 70, and branding-iron 20 are adapted and intended to reciprocate together in order to accomplish successive operations of branding, it is obvious that the pipes 77 and 80 are preferably in the form of flexible tubes, although rigid pipes can be employed if arranged with suitable extensions at right angles to the pipes or tubes shown in the drawings, said extensions being provided with sleeve-couplings, supply-reservoirs, or other means allowing for reciprocation.

The plunger 63, with the parts carried thereby, including the branding-iron 20, is reciprocated by means of the shaft 7 in the following manner: The plunger 63 has the pin or arm 91 extending therefrom, by which it is connected to the bifurcated slidingly-adjustable pitman 92. The pitman 92 has a ring or strap 93 at its end which encircles the outer end of the pin 91, said pin 91 having a perforation through that part of its end beyond said strap 93 through which a split pin 94' passes to retain said strap 93 in position, same abutting against a shoulder 94. (Indicated but not depicted in the drawings.) The pitman 92 is, as before stated, divided into two parts, the one nearer the plunger 63 being formed with a reduced portion or stem 95, carried on its end, which stem 95 fits into and reciprocates in the hollow cylindrical portion 96, forming the other half of the pitman. The stem 95 has formed upon it or fastened through it the pin 97, which abuts against the spring 98, located within the hollow cylindrical portion 96 between the end of said stem 95 and the internal end of the hollow portion of said hollow cylinder 96. Said hollow cylindrical portion 96 has formed upon one of its ends a ring or strap 99, which encircles the pin 100, formed eccentrically upon the end of the shaft 7, being fastened thereupon by the screw 101. With the rotation of the shaft the eccentric-pin 100 actuates the pitman 92, which through the intermediation of the plunger 63 reciprocates the branding-iron 20 so as alternately to make impact upon the cork represented by cork 46 in Fig. 5 and again to be withdrawn from such impact while the plunger-pin 45, acting in alternation to the branding-iron 20, pushes the branded crown-cork 46 off the shoe 37 into the position indicated by crown-cork 47, while the line of corks in groove 18 each move one place lower, the pitman 92 being made adjustable in the manner hereinbefore described, its rigidity as well as flexibility being both promoted by the spring 102, which encircles it and abuts against pin 134 and 135 and nicely adjusts the stroke of the plunger 63, so that the branding-iron 20 will make a proper impact upon the cork disk 32 of the crown-cork 46 in such a way as to allow for the difference in thickness of individual crown-corks.

The plunger-pin 45 is connected by the link 103 to the end 104 of the pivoted arm 105, which is pivoted to the standard 106 by the set-screw 107 and rests at its other end 108 upon the support 109, which end 108 is beveled at 110, so as to engage and ride upon the cam 111, which is formed or mounted on the shaft 7 at a point approximately opposite to the location of the eccentric 100, whereby the plunger-pin 45 is moved into engagement with the cork 46 at a point of time after the branding-iron 20 has been withdrawn from contact therewith by the actuation of the plunger 63, pitman 92, and connected parts by the eccentric 100. The plunger-pin 45 is normally withdrawn from protrusion into the groove 18 by the retractile spring 112, fastened to the arm 105 by the screw 113 and to the table 1 by the screw 114. A stop 115 is adjustably attached to the table 1 by means of the slotted plate 116 and the screw or screws 117. The stop 115 is surrounded by a buffer 118, of rubber or other soft or noise-deadening substance, against which the end 104 of the arm 105 strikes when drawn back by the spring 112. The standard 119, having an opening therethrough, (not shown,) acts as a guide or cross-head to insure the direct and effective reciprocation and action of the plunger-pin 45, as will readily be understood.

The operation of the machine can be started by the handle of the rod 120, secured by the plates 121 to the table 1 and connected with the wheel 122, which has on its side next to said table a hollow cylindrical portion or cap 123, having the notches 124 in its periphery, which notches coöperate with the notches 125, similarly formed on a hollow cylindrical portion formed on or engaging with the wheel 11, both of said notched portions encircling the shaft 7. By means of said notches 124 and 125 when the rod 120 is so drawn to the right as to make said notches engage each other the power applied by the belt 12 to the wheel or pulley 11 is imparted to the shaft 7 by reason of the fact that the notched portion 123 is formed integral with the shaft 7 or rigidly attached thereto. At the same time as wheel 10 is in fixed connection with the shaft 7 it is rotated, and thus actuates belt 13, which sets in motion shaft 14, carrying the corrugated roller 15, the eccentric 100 and the cam 111, being borne also upon said shaft 7, and thus actuated thereby, beginning also to exercise their functions, whereby the branding-iron 20 and plunger-pin 45 act alternately, as hereinbefore described.

Figure 1:
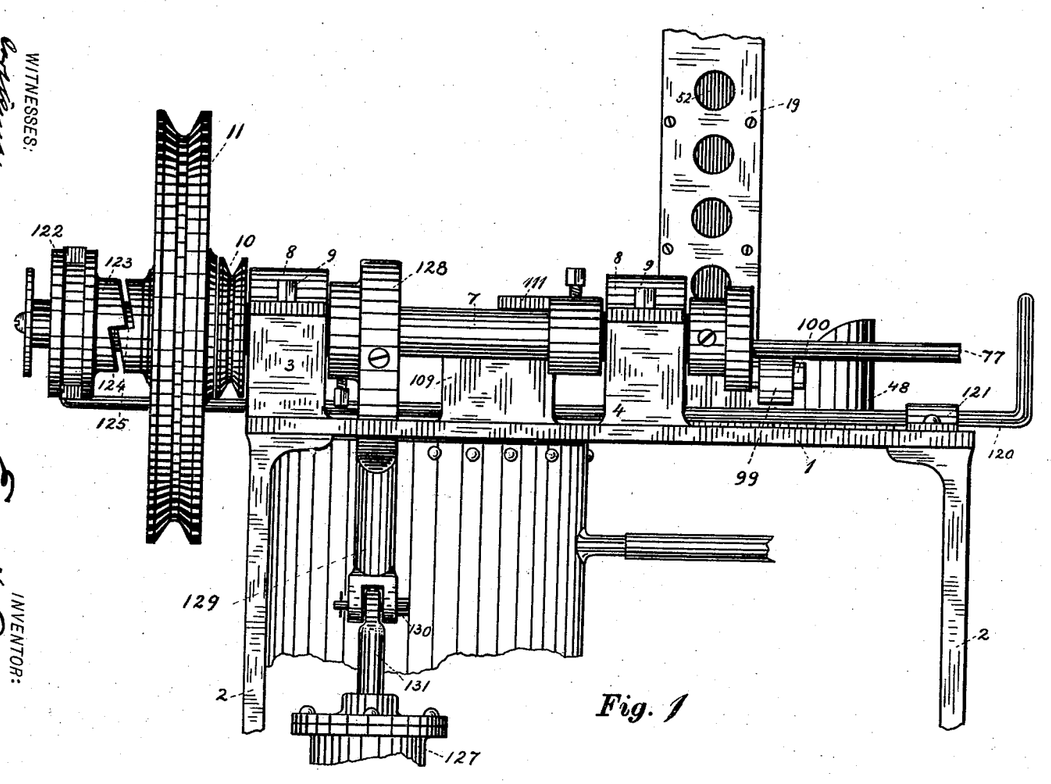
Figure 1 is a front elevation of my machine with the extreme upper and lower portions thereof broken away.

In the drawings I have shown an air-tank 126 and an air-pump 127, which is connected with the pipe or tube 77, although any other suitable source of compressed air and gas can be utilized; but, as illustrated in the drawings, (see Fig. 1,) said air-pump 127 is connected by the link 129 and pin 130 to the end of the piston-rod 131, and the gas is introduced through pipe 80.

The slot 136 in the rear wall 26 of the hopper 16 is provided, by way of precaution, to allow external assistance in case of one of the crown-corks in some manner becoming jammed underneath the roller 15.

A groove 137 is provided in the end of the shaft 7 in order to allow for the adjustment of the pin 100 at a greater or less degree of eccentric relation to the center of the shaft 7, whereby the length and character of stroke of the pitman 92 may be affected.

It is obvious that many minor changes may be made in the form, arrangement, and details of the several parts of my said machine without departing from the nature and spirit of my said invention.

What I claim, and desire to secure by Letters Patent, is—

1. In a cork-branding machine, the combination of an arm suitably actuated to eject the corks from the branding position, a spring to return said arm to its first position, a stop padded with rubber or similar material to deaden the noise of the return of said arm to its first position, substantially as described.

2. In a cork-branding machine, the combination of a shaft, means for actuating same, a cam thereupon, a pivotally-swinging arm supported by a rest adjacent to said cam, a plunger-ejector operated by said arm and connected thereto by a link, a spring, and an adjustable stop, substantially as described.

3. In a machine of the type set forth, a cork-chute with a reciprocating branding means and a reciprocating ejecting means movably related thereto, and means for actuating each of said means from a common drive.

4. In a machine of the type set forth, a cork-chute with a branding means movable with relation thereto, means for ejecting the corks, and a shaft having devices thereon to actuate each of said means one in advance of the other.

5. In a machine of the type set forth, a cork-chute with a branding means movable in relation thereto, means for ejecting the corks, a shaft with devices connected thereto and to each of said means for actuating the latter one in advance of the other.

6. In a machine of the type set forth, a cork-chute with a branding means movable in relation thereto, a cork-ejecting means, a pivoted spring-held arm carrying a link at its one end connected to said ejecting means, a shaft-carrying means for reciprocating said branding means, and means for actuating the other end of said arm.

7. In a machine of the type set forth, a cork-chute, a branding means and an ejecting means operating in planes transverse to each other movably related thereto, and means operated from a common drive for reciprocating said branding and ejecting means.

8. In a machine of the type set forth, a cork-chute with branding and ejecting means movable in relation thereto in planes transverse to each other, a shaft, and means connected thereto and to each of said means for operating the latter.

9. In a machine of the type set forth, a cork-chute with branding and ejecting means operating in planes transverse to each other, movably related to the cork-chute, a pivoted spring-held arm connected to the ejecting means, a shaft carrying means for actuating said arm and for actuating said branding means.

10. In a machine of the type set forth a cork-chute with a hopper at the upper end thereof having a roller therein with corrugated ribs on the roller forming channels therebetween, the hopper having teeth, some of which are bifurcated and are of greater length than the first-named teeth engaged by said corrugated ribs, and a toothed plate located above the roller.

11. In a machine of the type set forth, a cork-chute having a hopper with a roller in the hopper, passages in the chute with corrugated ribs on the roller located between said passages the hopper formed with teeth operating between the ribs and on the ribs, and a feed-plate toothed and located above the hopper-teeth.

12. In a machine of the type set forth, a cork-chute with a hopper thereon, and a channeled roller in the hopper, a toothed feed-plate located above the roller in the hopper engaging the channels of the roller, the chute having its one side extended upward and toothed to engage said roller below the point of engagement of the feed-plate teeth.

13. In a machine of the type set forth, a cork-chute surmounted by a hopper having a channeled roller therein, one side of the chute extending into the hopper and having teeth engaging in each of the channels of the roller, and said unchanneled portions of the roller.

14. In a machine of the type set forth, a cork-chute surmounted by a hopper having a channeled roller therein, a toothed feed-plate above the roller engaging in each of the channels of the roller and teeth engaging the unchanneled portions of the roller at a point below the feed-plate teeth.

15. In a machine of the type set forth, a cork-chute and a hopper having a channeled roller therein, teeth carried by the hopper and by the chute for engaging in the channeled and unchanneled portions of the roller.

16. In a machine of the type set forth, a cork-chute and a hopper with a feed-roller in the latter, a toothed feed-plate in the hopper engaging in the channels of the roller, and a toothed extension of the chute engaging the channels of the roller and also the unchanneled portions thereof.

17. In a machine of the type set forth, a cork-chute and a hopper having a feed-roller therein, corrugated spaced ribs on the roller, a toothed plate engaging in the spaces between the ribs, and a toothed means engaging in said spaces and engaging said ribs.

In testimony whereof I have affixed my signature, in presence of two witnesses, this 7th day of October, 1903.

EDWIN H. BAARE.

Witnesses:
 GLADYS WALTON,
 MAUD E. LETCHER.